3,402,058
PIGMENT MANUFACTURE
Kiyoshi Hashizume, Chiba, and Takane Miyake and Munehisa Yagiu, Tokyo, Japan, assignors to Tokyo Ink Manufacturing Co. Ltd., Tokyo, Japan
No Drawing. Filed Jan. 20, 1966, Ser. No. 521,818
Claims priority, application Japan, Apr. 8, 1965, 40/20,316
3 Claims. (Cl. 106—309)

ABSTRACT OF THE DISCLOSURE

A highly dispersible organic pigment is produced by blowing an inert gas into an aqueous slurry during the manufacture of the pigment, and the pigment thus floated onto the surface of the slurry is recovered.

The present invention relates to a process of manufacturing a pigment having improved dispersibility in such vehicles, for instance, as inks, paints and synthetic resins.

In the manufacture of artificial pigments, the pigment particles coming from the filtering and drying steps are not readily dispersible in most vehicles which they are designed to color. Presumably, this is due to the fact that the fines resulting from the first production step tend to agglomerate during drying, due to the high surface activity of the fine particles. The resultant agglomerates have a low surface activity and it is difficult to comminute these large size agglomerates by such simple means as crushing to obtain readily dispersible fines, roller or ball mills being usually employed for grinding the pigment.

It has been proposed to reduce or prevent the agglomeration of the pigment fines during drying by treating the same with surface active agents or rosins, or to emulsify them with a solvent. However, this has often resulted in an undesirable reduction of the compatibility of the pigment with the vehicle it is designed to color. To avoid this, it has been proposed to use so-called flush colors which are never dried and ground, but this has the disadvantage that the pigment is applied in the form of a paste, limiting its application under various conditions where only the pigment powders can be used.

It is accordingly an object of the present invention to overcome the above disadvantages and to obtain pigment powders of improved dispersibility. Such powders are applicable to a wide variety of vehicles and may be readily dispersed therein.

The above and other objects and advantages of this invention are obtained by producing an aqueous slurry of a pigment, blowing a gas into the slurry, which is inert to water and to the pigment, and recovering dry pigment particles from the slurry. The gas may be selected from the group consisting of air, nitrogen, argon, chlorofluorohydrocarbons ($CCl_2F_2$, $CHCl_2F$, $CHClF_2$), propane and butane, air and nitrogen being preferred. The preferred rate of gas flow, at atmospheric pressure, is 200 to 1000 cc./min., per 50 grams of pigment, for a period from 30 minutes to two hours.

The inert gas is blown into the pigment slurry during the manufacture of the pigment, for instance during the coupling reaction, lake formation or reprecipitation of such synthetic pigments as the phthalocyanine pigments, whereby the gas is adsorbed on the surface of the pigment to separate the same from the water of the pigment slurry. This treatment is called herein "gas flushing." Thus, the initially hydrophobic surfaces of the pigment particles adsorb the gas and the gas-enveloped fines are separated from the water and each other. When such pigment particles are subjected to filtration and drying, they do not agglomerate and the resultant fines are readily dispersible in suitable vehicles. Therefore, no expensive and cumbersome comminuting machinery is needed to handle the dried particles before they are incorporated in the vehicle.

If desired, the pigment particles prepared according to the invention may be further treated with surface active agents or rosins, or they may be emulsified with solvents, to increase their dispersibility even more.

While in no way limited thereby, the invention will be better understood by reference to the following examples showing some preferred embodiments thereof.

Example I

Thirty grams of copper phthalacyanine was dissolved in 300 g. of 98% sulfuric acid, stirred for one and a half hours and then poured into 3000 g. of water at 20° C. Nitrogen gas was blown into the slurry from a nitrogen bottle at a flow rate of 500 cc./min. for 30 minutes, while the slurry was continuously stirred. After the gas introduction and stirring was stopped, phthalocyanine blue separated spontaneously from the water and rose to the surface of the slurry. The separated pigment was filtered, washed with water until the washing liquor become neutral, and then dried.

0.1 gram of the resultant pigment powder was simply mixed with 100 g. of polyvinylchloride, 50 g. of dioctyl phthalate and 2 g. of barium stearate, and the mixture was kneaded for five minutes between two rollers. The resultant film was transparent but evenly colored blue.

By comparison, when the pigment was produced in exactly the same manner but without blowing nitrogen gas through the slurry, it has to be first blended with dioctyl phthalate in an automatic blender to form a toner as readily dispersible in polyvinylchloride by kneading between two rollers.

Example II

Twenty-eight grams of sodium salt of 2-chloro-3-toluidine-5-sulfonic acid was coupled with 17 g. of 2-hydroxy-3-naphthoic acid, and the resultant dye was suspended in water, heated to 80° C. and changed into a lake by adding an aqueous solution of 22 g. of 80% manganese sulfate, while stirring. Simultaneously with the addition of the manganese sulfate, $CHClF_2$ gas was introduced into the slurry from a bottle at a flow rate of 200 cc./min. After the addition of manganese sulfate was terminated, the gas was continued to be blown into the slurry for an hour while the mixture was continuously stirred. After the gas introduction and stirring were terminated, the pigment rose to the surface and the separated pigment was filtered, washed and dried.

A clearly colored and highly transparent baking paint was obtained simply by vigorously mixing the dried pigment particles with an alkyd melamine resin vehicle in a high-speed mixer for an hour. No such result could be obtained with a pigment prepared in the same manner but without gas "flushing" unless the pigment was first repeatedly crushed in a ball mill.

Example III

Sixty grams of fine acetoacetanilide particles were suspended in water and subjected to a coupling reaction by adding a solution of 40 g. of diazosalt of 3,3′-dichlorobenzidine. Simultaneously with the introduction of the diazosalt, propane gas was blown into the slurry at a flow rate of 200 cc./min. The introduction of the gas was continued for 30 minutes after the coupling reaction had been completed. The formed pigment was then filtered, washed and dried.

The same procedure was repeated with butane gas, with identical results.

A clearly colored printing ink having high coloring power was obtained by vigorously mixing the pigment with a varnish for a gravure printing ink, mixing being effected in a high-speed mixer for 30 minutes.

This result could be obtained with a pigment prepared in the same manner but without "gas flushing" only when the pigment was first crushed for 15 hours in a ball mill.

Example IV

Crude copper phthalocyanine was crushed in a ball mill for 48 hours with xylene and the xylene was then removed by steam distillation to produce a pressed cake of α-type cupric phthalocyanine (stable crystals). Ninety-eight grams of the pressed cake (30 grams as pigment) was placed into one liter of water was dispersed therein under stirring, with the addition of 15 ml. of a 1% aqueous solution of sodium salt of lauryl sulfate. Nitrogen or argon gas was introduced into the slurry at a flow of 500 cc./min. while 5 ml. of 5% calcium chloride was simultaneously introduced gradually and drop by drop. Thirty minutes after the addition of calcium chloride was completed, the gas blowing was discontinued, whereupon phthalocyanine blue began to rise to the surface and separate from the water. The pigment was filtered, washed with water until the washing liquor produced little turbidity in an aqueous solution of ammonium oxalate, and dried.

A clearly colored paint was obtained by simply mixing the resultant pigment vigorously with nitrocellulose lacquer. The same result could be obtained with a pigment prepared in the same manner but without "gas flushing" only when the pigment was first crushed in a ball mill for 48 hours.

As will be apparent from the description, the term "pigment" is used throughout the specification and claims to designate also toners and lakes, and the like.

While the invention has been described in connection with certain preferred embodiments, it will be clearly understood that many modifications and variations may occur to those skilled in the art, particularly after benefiting from the present teaching, without departing from the spirit and scope thereof, as defined in the appended claims.

We claim:

1. A process of manufacturing an organic pigment having improved dispersibility, which comprises:
   (a) blowing a gas into an aqueous slurry of the pigment, during manufacture thereof whereby the pigment rises to the surface of the slurry,
      (1) the gas being inert to water and to the pigment, and
   (b) recovering the pigment floated onto the surface of the slurry.

2. The process of claim 1, wherein the inert gas is selected from the group consisting of air, nitrogen, argon, a chlorofluorohydrocarbon, propane and butane.

3. The process of claim 1, wherein the gas is blown into the pigment slurry at atmospheric pressure at a rate of 200 to 1000 cubic centimeters per minute per 50 grams of pigment, for a period from 30 minutes to two hours.

References Cited

UNITED STATES PATENTS 2,334,812   11/1943   Detrick et al. _____ 106—309

JAMES E. POER, *Primary Examiner.*